United States Patent
Perko et al.

(10) Patent No.: US 10,190,556 B2
(45) Date of Patent: Jan. 29, 2019

(54) SYSTEM AND METHOD FOR LUBRICATING A CRYOGENIC PUMP

(71) Applicant: Caterpillar Inc., Peoria, IL (US)

(72) Inventors: Joshua T. Perko, Washington, IL (US); Dana R. Coldren, Secor, IL (US); Glenn B. Cox, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 41 days.

(21) Appl. No.: 15/401,702

(22) Filed: Jan. 9, 2017

(65) Prior Publication Data

US 2018/0195479 A1 Jul. 12, 2018

(51) Int. Cl.
*F02M 59/44* (2006.01)
*F02M 21/02* (2006.01)

(52) U.S. Cl.
CPC ........ *F02M 59/44* (2013.01); *F02M 21/0215* (2013.01); *F02M 21/0221* (2013.01); *F02M 21/0227* (2013.01)

(58) Field of Classification Search
CPC ............... F02M 59/44; F02M 21/0227; F02M 21/0221; F02M 21/0215
See application file for complete search history.

(56) References Cited

U.S. PATENT DOCUMENTS

| | | | | |
|---|---|---|---|---|
| 4,443,160 A | * | 4/1984 | Berthold | F04B 53/142 417/270 |
| 4,792,289 A | * | 12/1988 | Nieratschker | F04B 15/08 417/259 |
| 4,984,970 A | * | 1/1991 | Eickmann | F04B 43/0063 417/271 |
| 5,511,955 A | * | 4/1996 | Brown | F04B 3/003 417/259 |
| 5,572,919 A | * | 11/1996 | Ishizaki | F04B 1/2021 417/270 |
| 5,862,704 A | * | 1/1999 | Seljestad | F04B 1/2085 74/60 |
| 6,082,118 A | | 7/2000 | Endrizzi et al. | |
| 6,230,761 B1 | | 5/2001 | Richard et al. | |
| 6,264,437 B1 | * | 7/2001 | Porel | F02M 59/04 105/96.1 |
| 6,899,115 B1 | | 5/2005 | Adler | |

(Continued)

FOREIGN PATENT DOCUMENTS

| | | |
|---|---|---|
| CN | 203560719 U | 4/2014 |
| CN | 203928595 U | 11/2014 |
| CN | 205297958 U | 6/2016 |

*Primary Examiner* — Joseph Dallo
(74) *Attorney, Agent, or Firm* — Leydig, Voit & Mayer, LTD.

(57) ABSTRACT

A cryogenic LNG fuel system is provided that includes a tank for storing LNG and a LNG fill system including a LNG inlet passage for directing a flow of LNG into the tank. A cryogenic pump is in fluid communication with the tank and includes a pumping element at least partially immersed in the LNG for directing the LNG out of the tank and a seal. A lubricant system is provided that includes a lubricant reservoir and a lubricant inlet passage in communication with the lubricant reservoir and the LNG inlet passage. The lubricant system is adapted to introduce the lubricant into the flow of LNG in the LNG inlet passage such that at least a portion of the lubricant is entrained in the LNG in the LNG inlet passage and carried into the tank.

20 Claims, 3 Drawing Sheets

(56) References Cited

U.S. PATENT DOCUMENTS

| | | | |
|---|---|---|---|
| 6,899,146 B2 | 5/2005 | Bingham et al. | |
| 7,416,045 B2 * | 8/2008 | Gleasman | B60K 17/105 180/305 |
| 8,205,777 B2 | 6/2012 | Nishikwa et al. | |
| 9,039,923 B2 | 5/2015 | Mahmoud et al. | |
| 2006/0283196 A1 | 12/2006 | Rosenbaum et al. | |
| 2009/0188479 A1 | 7/2009 | Haudel | |
| 2016/0215766 A1 * | 7/2016 | Brown | F04B 9/109 |

* cited by examiner

SYSTEM AND METHOD FOR LUBRICATING A CRYOGENIC PUMP

TECHNICAL FIELD

This disclosure relates generally to a cryogenic pump for delivering liquefied natural gas to an internal combustion engine and, more particularly, to a system and method for lubricating the cryogenic pump.

BACKGROUND

Machines such as mining trucks, locomotives, marine vessels and the like have recently begun using alternative fuels, alone or in conjunction with traditional fuels, to power their engines. For example, large displacement engines may use a gaseous fuel, alone or in combination with a traditional fuel such as diesel, to operate. Because of their relatively low densities, gaseous fuels, for example, natural gas or petroleum gas, are carried onboard vehicles in liquid form. These liquids, the most common including liquefied natural gas (LNG) or liquefied petroleum gas (LPG), are stored in insulated tanks on the machine at cryogenic temperatures, from where a desired quantity of fuel is pressurized, evaporated, and provided to fuel the engine.

Pumps used to pressurize LNG or LPG for delivery to the engine of the machine may include a piston, that is reciprocally mounted in a cylinder bore. The piston is moved back and forth in the cylinder by hydraulic pressure to actuate a pumping assembly of the pump to draw in and then pressurize the LNG. Power to move the piston may be provided by different means, such as electrical, mechanical or hydraulic power. Pumps that include multiple pistons are also known.

An issue with cryogenic pumps in such engine systems is that extreme operating conditions may limit operating life span. In particular, a limiting factor with respect to the operating life span of such pumps is the seals in the pump. LNG typically has a relatively low lubricity. As a result, the pump seals that are exposed to the pressurized LNG can wear out relatively quickly due to lack of lubrication. These pump seals can be hard to replace. Lubricants typically freeze at the low temperatures at which the LNG is maintained, for example −160° C., making it difficult to add lubricant for the seals into the system.

U.S. Pat. No. 6,899,146 ("the '146 patent") discloses an apparatus for dispensing LNG to natural gas powered motor vehicles. The apparatus includes a LNG flow path and a CNG flow path, each of which communicate with a LNG storage tank. LNG from the LNG flow path may be selectively directed to the CNG flow path which includes a vaporizer configured to produce CNG from the pressurized LNG. The '146 patent discloses that a source of lubricant can be coupled with the CNG flow path to introduce and mix lubricant with the CNG to provide lubrication of the components used to process and combust the CNG. However, the '146 patent discloses no system or method for introducing lubricant into the LNG path and thus no source of lubrication is provided for the components associated with handling the LNG.

SUMMARY

In one aspect, the disclosure describes a cryogenic LNG fuel system including a tank defining a chamber for storing LNG and a LNG fill system including a LNG inlet passage in communication with the tank for directing a flow of LNG into the chamber. A cryogenic pump is in fluid communication with the chamber. The cryogenic pump includes a pumping element at least partially immersed in the LNG. The pumping element includes a plunger adapted for reciprocating movement in a barrel chamber adapted to receive LNG to produce a pumping action that directs the LNG from the barrel chamber out of the tank. The pumping element includes a seal arranged between the plunger and the inside wall of the barrel chamber. A lubricant system includes a lubricant reservoir for storing a supply of a lubricant and a lubricant inlet passage in communication with the lubricant reservoir and the LNG inlet passage. The lubricant system is adapted to introduce the lubricant via the lubricant inlet passage into the flow of LNG in the LNG inlet passage such that at least a portion of the lubricant is entrained in the LNG in the LNG inlet passage and carried into the tank wherein the lubricant lubricates the pumping element and the seal.

In another aspect, the disclosure describes a method for lubricating the pumping element of a cryogenic pump in fluid communication with a tank storing LNG with the pumping element at least partially immersed in the LNG. The pumping element includes at least one seal. The method includes the step of directing a flow of LNG into the tank via a LNG inlet passage in communication with the tank. The method further includes the step of introducing a lubricant into the flow of LNG in the LNG inlet passage such that at least a portion of the lubricant is entrained in the LNG in the LNG inlet passage and carried into the tank wherein the lubricant lubricates the pumping element and the seal.

In yet another aspect, the disclosure describes an engine system for a machine. The engine system includes an engine and a tank for storing LNG that defines a chamber. The tank is in communication with the engine. A cryogenic pump is arranged at least partially in the tank and adapted to direct LNG from the tank to the engine. The cryogenic pump includes a pumping element at least partially immersed in the LNG. The pumping element includes a plunger adapted for reciprocating movement in a barrel chamber adapted to receive LNG to produce a pumping action that directs the LNG from the barrel chamber out of the tank and toward the engine. The pumping element includes a seal arranged between the plunger and the inside wall of the barrel chamber. A lubricant system is adapted to introduce frozen lubricant into the tank chamber such that at least a portion of the lubricant is entrained in the LNG in the tank chamber via sublimation and thereby lubricates the pumping element and the seal.

DETAILED DESCRIPTION

Figure 1:
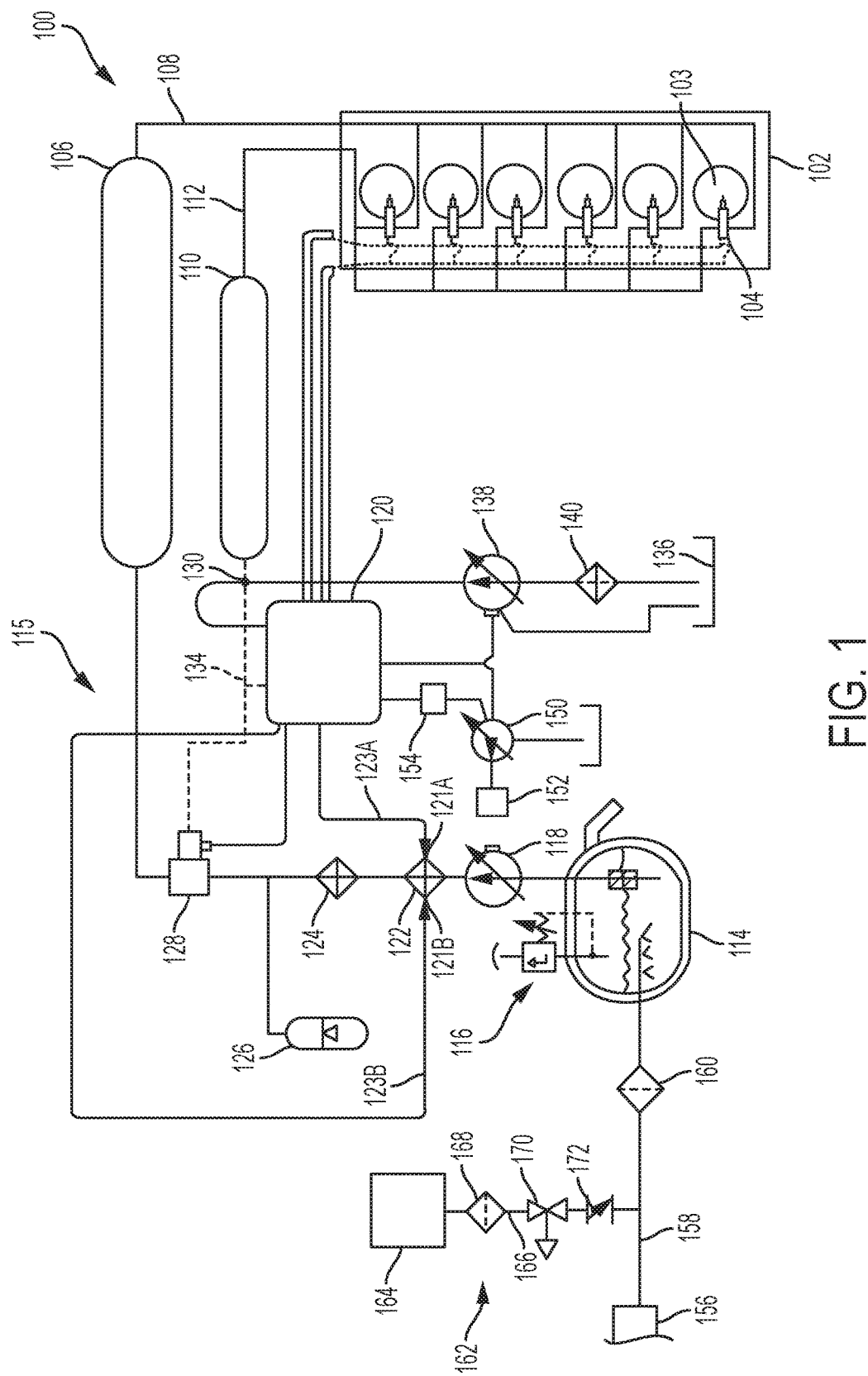
FIG. 1 is a schematic diagram of an engine system having a compressed gas fuel system that includes a liquid natural gas cryogenic fuel storage tank and corresponding fuel pump in accordance with the disclosure.

This disclosure relates to a system for delivering cryogenic liquefied natural gas (LNG) to an engine of a machine that is configured to utilize a gaseous fuel (e.g., methane or hydrocarbon mixtures commonly known as natural gas or petroleum gas). Such an engine may be a direct injection gas (DIG) or indirect injection gas engine. A schematic diagram of an engine system 100, which in the illustrated embodiment uses liquid diesel fuel as the ignition source, is shown in FIG. 1. It should be appreciated that port injection engines, spark ignition engines and/or engines using a different ignition mode are also contemplated. The engine system 100 includes an engine 102 having a fuel injector 104 associated with each engine cylinder 103. The fuel injector 104 can be a dual-check injector configured to independently inject predetermined amounts of two separate fuels, in this case, diesel and natural gas, into the engine cylinders.

The fuel injector 104 is connected to a high-pressure gaseous fuel rail 106 via a high-pressure gaseous fuel supply line 108 and to a high-pressure liquid fuel rail 110 via a liquid fuel supply line 112. In the illustrated embodiment, the gaseous fuel is natural or petroleum gas that is provided through the high-pressure gaseous fuel supply line 108 at a pressure of between about 10-50 MPa, and the liquid fuel is diesel, which is maintained within the high-pressure liquid fuel rail 110 at about 15-100 MPa, but any other pressures or types of fuels may be used depending on the operating conditions of each engine application. The liquid fuel can be any hydrocarbon based fuel; for example DME (Di-methyl Ether), biofuel, MDO (Marine Diesel Oil), or HFO (Heavy Fuel Oil).

Whether the engine system 100 is installed in a mobile or a stationary application, each of which is contemplated, the engine system 100 may include a cryogenic LNG fuel system 115. The LNG for the cryogenic LNG fuel system 115 may be stored in a chamber defined by a tank 114, which can be a cryogenic storage tank that is pressurized at a relatively low pressure, for example, atmospheric, or at a higher pressure. In the illustrated embodiment, the tank 114 is insulated to store LNG at a temperature of about −160° C. (−256° F.) and a pressure that is between about 100 and 1750 kPa, but other storage conditions may be used. The tank 114 may further include a pressure relief valve 116. LNG may be introduced into the cryogenic LNG fuel system 115 via a LNG fill system that includes a LNG system inlet 156 that communicates with the interior of the tank 114 via a suitable inlet passage 158 that carries the flow of LNG to the tank 114. To remove impurities from the LNG entering the system, a LNG inlet filter 160 may be provided in the inlet passage 158 upstream of the tank 114. In the description that follows, a DIG engine system embodiment is used for illustration, but it should be appreciated that the systems and methods disclosed herein are applicable to any machine, vehicle or application that uses cryogenically stored gas, for example, a locomotive in which the tank 114 may be carried in a tender car.

Relative to the particular embodiment illustrated, during operation, LNG from the tank is pressurized, still in a liquid phase, in a pump 118, which raises the pressure of the LNG while maintaining the LNG in a liquid phase. The pump 118 is configured to selectively increase the flow of the LNG that can vary in response to a command signal provided to the pump 118 from an electronic controller 120. The pump 118 is shown external to the tank 114 in FIG. 1 for illustration, but it is contemplated that the pump 118 may be in fluid communication with the tank chamber and at least partially be disposed within the tank 114, as is illustrated in the figures that follow, for example, in FIG. 2. Although the LNG is present in a liquid state in the tank, the present disclosure will make reference to compressed or pressurized LNG for simplicity when referring to LNG that is present at a pressure that exceeds storage pressure.

The pressurized LNG provided by the pump 118 is heated in a heat exchanger 122. The heat exchanger 122 provides heat to the compressed LNG to change the LNG phase to a gaseous/supercritical state which is more suitable for combustion. In general, the fuel is expected to enter the heat exchanger in a cryogenic, liquid state, and exit the heat exchanger in a supercritical gas state, which is used herein to describe a state in which the fuel is gaseous but has a density that is between that of its gaseous and liquid phases.

The heat exchanger 122 may be any known type of heat exchanger or heater for use with LNG. In the illustrated embodiment, the heat exchanger 122 is a jacket water heater that extracts heat from engine coolant. In alternative embodiments, the heat exchanger 122 may be embodied as an active heater, for example, a fuel fired or electrical heater, or may alternatively be a heat exchanger using a different heat source, such as heat recovered from exhaust gases of the engine 102, a different engine belonging to the same system such as what is commonly the case in locomotives, waste heat from an industrial process, and other types of heaters or heat exchangers. In the embodiment shown in FIG. 1, which uses engine coolant as the heat source for the heat exchanger 122, a pair of temperature sensors 121A and 121B are disposed to measure the temperature of engine coolant entering and exiting the heat exchanger 122 and provide corresponding temperature signals 123A/B to the electronic controller 120.

Liquid fuel, or in the illustrated embodiment diesel fuel, is stored in a fuel reservoir 136. From there, fuel is drawn into a fuel pump 138 through a filter 140. The fuel pump 138 may have a variable flow capability to provide fuel to the engine at a variable rate depending on the operating mode of the engine. The rate of fuel provided by the fuel pump 138 can be controlled in response to a command signal from the electronic controller 120. Pressurized fuel from the fuel pump 138 is provided to the high-pressure liquid fuel rail 110. Similarly, the pump 118 has a variable supply capability that is responsive to a signal from the electronic controller 120.

Contaminants may be removed from the natural gas exiting the heat exchanger 122 by a filter 124. As can be appreciated, the natural gas passing through the filter 124 may be present in more than one phase such as gas or liquid. An optional natural gas accumulator 126 may collect filtered gas upstream of a pressure regulator 128 that can selectively control the pressure of gas provided to the high-pressure gaseous fuel rail 106 that is connected to the high-pressure gaseous fuel supply line 108. To operate the pump 118, a hydraulic pump 150 having a variable displacement and selectively providing pressurized hydraulic fluid to the pump 118 via a valve system 152 is used. Operation of the hydraulic pump 150 is controlled by an actuator 154 that responds to commands from the electronic controller 120. The valve system 152 also operates in response to commands from the controller 120. It will be appreciated that while system 100 illustrates one or more embodiment, other configurations are contemplated.

Figure 2:
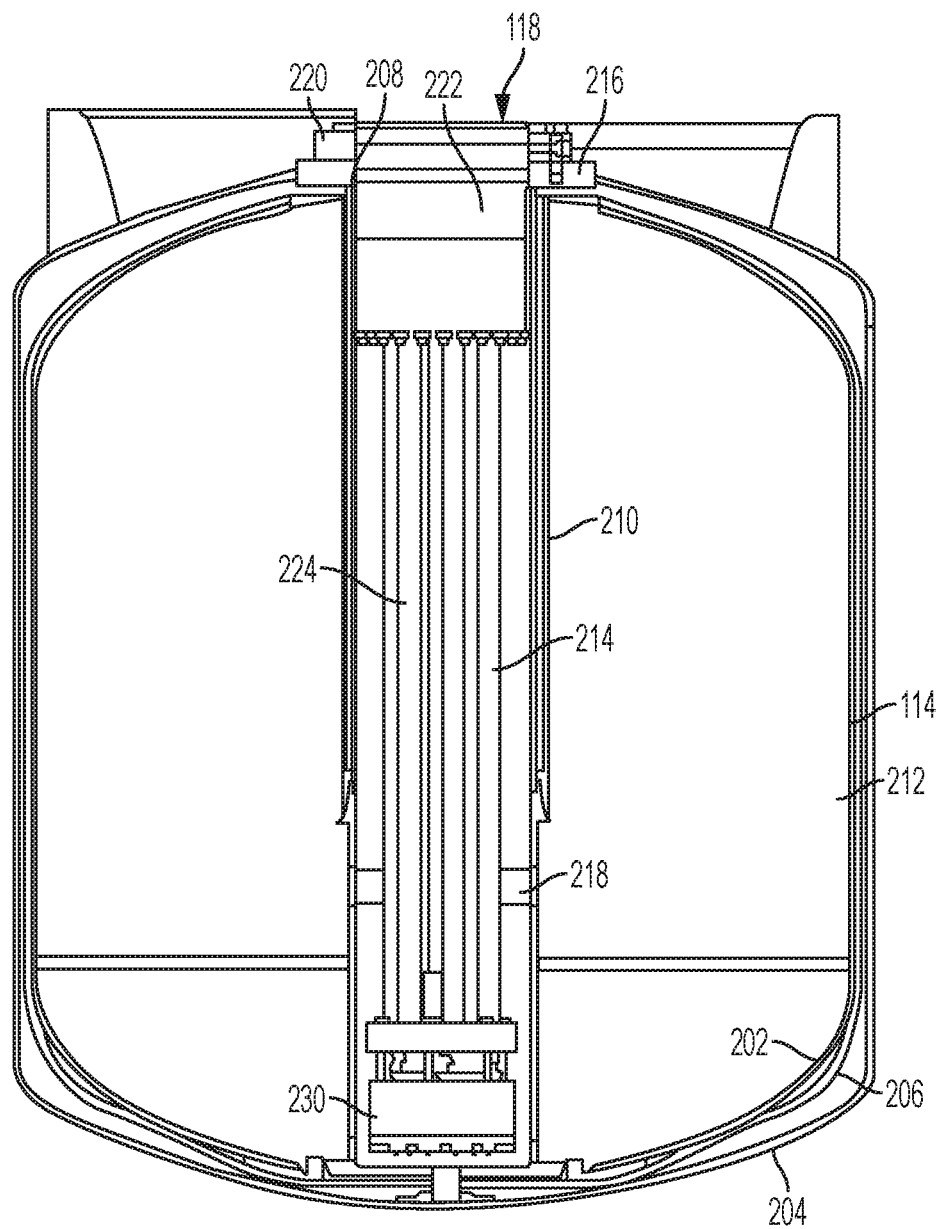
FIG. 2 is a section view of a cryogenic tank including a cryogenic pump in accordance with the disclosure.

A section view of the tank 114 having the pump 118 at least partially disposed therein is shown in FIG. 2. The tank 114 may include an inner wall 202, which defines a chamber 212 containing the LNG at cryogenic storage temperature and pressure, and an outer wall 204. A layer of insulation 206 may optionally be used, and/or a vacuum may be created along a gap between the inner wall 202 and the outer wall 204. Both the inner wall 202 and the outer wall 204 have a common opening 208 at one end of the tank, which surrounds a cylindrical casing 210 that extends into a tank interior 212. The cylindrical casing 210 is hollow and defines a pump socket 214 therein that extends from a mounting flange 216 into the tank chamber 212 and accommodates the pump 118 therein. A seal 218 may separate the interior of a portion of the pump socket 214 from the tank chamber 212.

The pump 118 in the illustrated embodiment includes a pump flange 220 that supports the pump 118 on the mounting flange 216 of the tank 114. The pump 118 generally includes a drive assembly 222 that operates to selectively activate, in this case, one or more pushrods 304, which in the figure are inside guide rods. The pushrods 224, which are caused to reciprocate during operation by the drive assembly 222, extend from the drive assembly 222 to a pumping assembly 230. The drive assembly 222 may be powered by any suitable means including, for example, hydraulically, mechanically or electrically. Moreover, structures or mechanisms other than pushrods may be used to transmit power produced by the drive assembly 222 to the pumping assembly 230 such as for example, hydraulic or pneumatic systems or combinations thereof.

Figure 3:
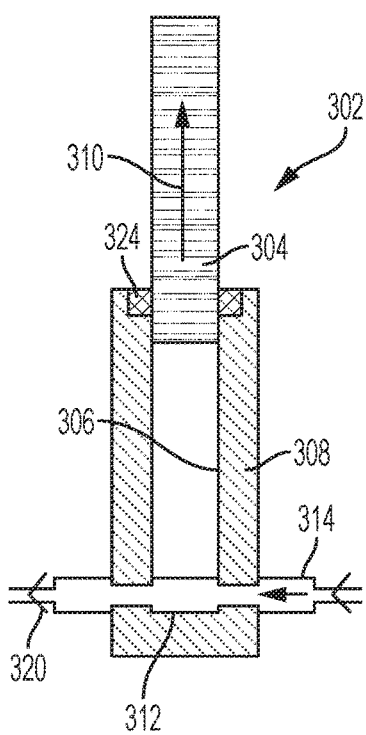
FIG. 3 is a partial section view of a pumping element of the cryogenic pump executing a suction stroke in accordance with the disclosure.
Figure 4:
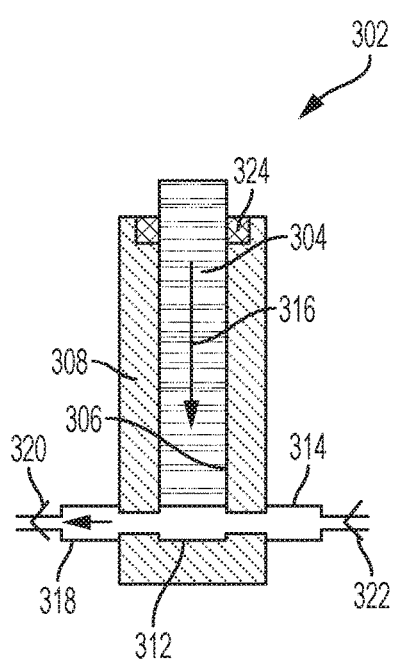
FIG. 4 is a partial section view of a pumping element of the cryogenic pump executing a discharge stroke in accordance with the disclosure.

During operation, the pumping assembly 230, which may be immersed in cryogenic fluid, operates to pump fluid from the tank interior 212 in order to supply the engine 102 with fuel, as previously described. The pumping assembly 230 may be configured to translate, in this case, the reciprocating motion of the pushrods 224 into a pumping action that operates the pumping assembly 230. To this end, the pumping assembly 230 may include one or more pumping elements 302. One pumping element 302 is shown in FIGS. 3 and 4. As shown, the pumping element 302 may be in the form of a plunger 304 adapted to move reciprocatingly in a barrel chamber 306 of a pump head 308 to thereby generate a pumping action. In certain embodiments, multiple pumping elements 302 may be provided and these pumping elements 302 may move in a sequential and/or alternating manner to provide a consistent output of LNG from the cryogenic pump 118. Different numbers and arrangements of pumping elements 302 are contemplated and fall within the scope of the disclosure.

FIG. 3 provides a cross-sectional view of the pumping element 302 executing a suction stroke. During the suction stroke, the plunger 304 is being drawn in direction 310 away from an end wall 312 of the barrel chamber 306 of the pump head 308. This movement of the plunger 304 draws cryogenic LNG into the barrel chamber 306 through an inlet port 314. A cross-sectional view of the pumping element 302 executing a discharge stroke is provided in FIG. 4. During the discharge stroke, the plunger 304 is moving in direction 316 towards the end wall 312 of the barrel chamber 306 such that the cryogenic LNG in the barrel chamber 306 is driven out of the barrel chamber through an outlet port 318. The outlet port 318 may be provided with a check valve 320 configured to prevent LNG from flowing back into the barrel chamber 306 through the outlet port 318 during the suction stroke of the reciprocal plunger 304. Similarly, the inlet port 314 may be configured with a check valve 322 configured to ensure that LNG does not exit the barrel chamber 306 through the inlet port 314 during the discharge stroke of the plunger 304.

To prevent LNG from leaking out of the barrel chamber 306 past the plunger 304, one or more pump seals 324 may be provided. In the illustrated embodiment, a pump seal 324 is provided at a first end of the pump head 308 that is opposite the end wall 312 of the barrel chamber 306. The pump seal 324 may be arranged in a groove in the pump head 308 such that the pump seal 324 extends between an interior wall of the barrel chamber 306 and the plunger 304. In this position, the pump seal 324 can help prevent LNG from leaking out of the barrel chamber 306 in the space between the plunger 304 and the barrel chamber interior wall. The pump seal 324 may include a single seal element or may include multiple seal elements that are assembled together to form a seal assembly. Moreover, additional pump seals may be provided at different positions along the length of the barrel chamber 306 and the plunger 304. The pump seal or seals 324 may be constructed of any suitable material such as, for example, PTFE or other similar materials.

To provide lubrication to the pumping element 302 and, in particular, the pump seal 324, the engine system 100 and cryogenic LNG fuel system 115 may be configured with a lubricant system 162 that allows for the selective introduction of a lubricant, such as oil, into the LNG stored in the tank 114. As shown in FIG. 1, the lubricant system 162 may communicate with the LNG inlet passage 158 at a point downstream of the LNG system inlet 156 and upstream of the tank 114. Additionally, the lubricant system 162 may communicate with the LNG inlet passage 158 at a point upstream of the LNG inlet filter 160, i.e., at a point between the LNG system inlet 156 and the LNG inlet filter 160. However, an arrangement in which the lubricant system 162 communicates with the LNG inlet passage at point downstream of the LNG inlet filter 160, i.e., between the LNG inlet filter 160 and the tank 114 may also be used.

For storing a supply of lubricant (e.g., oil), the lubricant system 162 may include a reservoir 164. A lubricant inlet passage 166 may communicate with the lubricant reservoir 164 and the LNG inlet passage 158 so as to allow lubricant to be directed from the reservoir 164 into the flow of LNG contained in the LNG inlet passage 158 such that at least a portion of the lubricant is entrained in the LNG in the LNG inlet passage and carried into the tank wherein the lubricant lubricates the pumping element 302 and the seal 324. To remove contaminants from the lubricant, a lubricant filter 168 may be provided in the lubricant inlet passage 158 downstream of the lubricant reservoir 164.

The lubricant inlet passage 166 may include a lubricant control valve 170 arranged between the lubricant reservoir 164 and the LNG inlet passage 158 that may be moveable between open and closed positions in order to selectively shut off or open up the supply of lubricant from the lubricant reservoir 164 into the cryogenic LNG fuel system 115. The lubricant control valve 171 may be operated, for example, by signals from the system controller 120. The lubricant inlet passage 166 may further include a check valve 172 that is configured to permit the flow of lubricant in the direction towards the LNG inlet passage 158 but to prevent the flow of LNG from the LNG inlet passage 158 in the direction towards the lubricant reservoir 164 and, in the case of the illustrated embodiment, the control valve 171.

In other embodiments, the lubricant system 162 may be adapted such that at least a portion of lubricant may be introduced into the tank 114 in a frozen state. Once present in the tank 114, the frozen lubricant may experience sublimation over time in the tank environment such that at least a portion of the lubricant is carried with the LNG into the pumping element 302 where it lubricates the pumping element 302 and the seal 304.

INDUSTRIAL APPLICABILITY

The present disclosure is applicable to any type of application that involves the use of a cryogenic LNG fuel system including a cryogenic pump. The present disclosure provides a system and method for lubricating a cryogenic pump in a cryogenic LNG fuel system that can lengthen the operating life of the seals in the cryogenic pump. This, in turn, can lead to a longer operating life for the cryogenic pump as the life span of the seals can be a limiting factor with respect to the life span of the cryogenic pump.

As noted previously, lubricant typically freezes at the low temperatures at which LNG is maintained. Thus, lubricant added to a LNG tank containing a cryogenic pump will freeze and fall to the bottom of the tank and thus not provide any lubrication to the cryogenic pump. The lubrication system and method of the present disclosure introduces the lubricant in the LNG supply system that can be used to fill the LNG tank 114. With the system and method of present disclosure, it is believed that the lubricant freezes as the lubricant is introduced into the LNG inlet stream and at least a portion of the lubricant is carried into the LNG tank 114 via convective sublimation. In particular, when the LNG in the LNG inlet passage 158 is directed across the frozen lubricant, the lubricant sublimates and the flow of LNG picks up at least a portion of the lubricant and entrains it in the LNG. This sublimation of the lubricant can allow a portion of the lubricant to pass through the LNG inlet filter 160, which in the case of the embodiment shown in FIG. 1 is downstream of where the lubricant inlet passage 166 communicates with the LNG inlet passage 158. Once introduced into the tank 114, the motion of the machine on which the LNG fuel system 115 is provided can help the lubricant to stay in suspension and provide lubricity to the LNG and, more specifically, to the pumping elements 302 and the pump seals 324 of the cryogenic pump 118.

Alternatively or additionally, as noted above, the lubricant system 162 may introduce frozen lubricant into the tank 114 and that frozen lubricant may experience sublimation over time such that at least a portion of the lubricant is carried with the LNG into the pumping element 302 where it lubricates the pumping element 302 and the seal 304.

This disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A cryogenic LNG fuel system comprising:
a tank for storing LNG, the tank defining a chamber;
a LNG fill system including a LNG inlet passage in communication with the tank for directing a flow of LNG into the chamber;
a cryogenic pump in fluid communication with the chamber, the cryogenic pump including a pumping element at least partially immersed in the LNG, the pumping element including a plunger adapted for reciprocating movement in a barrel chamber adapted to receive LNG so as to produce a pumping action that directs the LNG from the barrel chamber out of the tank, the pumping element including a seal arranged between the plunger and an inside wall of the barrel chamber; and
a lubricant system including a lubricant reservoir for storing a supply of a lubricant, the lubricant reservoir being arranged external to the tank and the cryogenic pump, and a lubricant inlet passage in communication with the lubricant reservoir and the LNG inlet passage, the lubricant system being adapted to introduce the lubricant via the lubricant inlet passage into the flow of LNG in the LNG inlet passage such that at least a portion of the lubricant is entrained in the LNG in the LNG inlet passage and carried into the tank wherein the lubricant lubricates the pumping element and the seal.

2. The cryogenic LNG fuel system of claim 1 wherein the LNG fill system includes a LNG filter arranged in the LNG inlet passage.

3. The cryogenic LNG fuel system of claim 2 wherein the lubricant inlet passage intersects the LNG inlet passage and the LNG filter is arranged downstream of where the lubricant inlet passage intersects the LNG inlet passage in a direction of the LNG flow toward the tank.

4. The cryogenic LNG fuel system of claim 1 wherein the lubricant system includes a lubricant control valve arranged in the lubricant inlet passage and adapted to move between an open position that allows the flow of lubricant from the lubricant reservoir to the LNG inlet passage and a closed position that shuts off the flow of lubricant from the lubricant reservoir to the LNG inlet passage.

5. The cryogenic LNG fuel system of claim 4 wherein the lubricant system includes a lubricant filter arranged in the lubricant inlet passage.

6. The cryogenic LNG fuel system of claim 5 wherein the lubricant filter is arranged between the lubricant control valve and the lubricant reservoir.

7. The cryogenic LNG fuel system of claim 4 further including a lubricant check valve arranged in the lubricant inlet passage and configured to permit the flow of lubricant in a first direction towards the LNG inlet passage but to prevent the flow of LNG from the LNG inlet passage in a second direction towards the lubricant reservoir.

8. The cryogenic LNG fuel system of claim 7 wherein the lubricant check valve is arranged in the lubricant inlet passage downstream of the lubricant control valve in a direction of fluid flow from the lubricant reservoir towards the LNG inlet passage.

9. The cryogenic LNG fuel system of claim 1 wherein the lubricant is oil.

10. A method for lubricating the pumping element of a cryogenic pump in fluid communication with a tank storing LNG with the pumping element at least partially immersed in the LNG, the pumping element including at least one seal, the method comprising the steps of:
directing a flow of LNG into the tank via a LNG inlet passage in communication with the tank; and
introducing a lubricant into the flow of LNG in the LNG inlet passage before the LNG enters the tank such that at least a portion of the lubricant is entrained in the LNG in the LNG inlet passage and carried into the tank wherein the lubricant lubricates the pumping element and the seal.

11. The method of claim 10 further including the step of filtering contaminants from the LNG flowing in the LNG inlet passage.

12. The method of claim 10 wherein the lubricant is entrained in the LNG via convective sublimation.

13. The method of claim 10 further including the step of controlling the introduction of lubricant into the LNG inlet passage via a lubricant control valve adapted to move between an open position that allows the flow of lubricant into the LNG inlet passage and a closed position that shuts off the flow of lubricant into the LNG inlet passage.

14. The method of claim 10 wherein the lubricant is oil.

15. An engine system for a machine, the engine system comprising:
an engine;
a tank for storing LNG, the tank defining a chamber, the tank being in communication with the engine;
a cryogenic pump arranged at least partially in the tank and adapted to direct LNG from the tank to the engine, the cryogenic pump including a pumping element at least partially immersed in the LNG, the pumping element including a plunger adapted for reciprocating movement in a barrel chamber adapted to receive LNG so as to produce a pumping action that directs the LNG from the barrel chamber out of the tank and toward the engine, the pumping element including a seal arranged between the plunger and an inside wall of the barrel chamber; and
a lubricant system adapted to introduce frozen lubricant into the tank chamber such that at least a portion of the lubricant is entrained in the LNG in the tank chamber via sublimation and thereby lubricates the pumping element and the seal.

16. The engine system of claim 15 further including a LNG fill system including an LNG inlet passage in communication with the tank for directing a flow of LNG into the chamber.

17. The engine system of claim 16 wherein the LNG fill system includes a LNG filter arranged in the LNG inlet passage.

18. The engine system of claim 15 wherein the lubricant system includes a lubricant reservoir for storing a supply of a lubricant and a lubricant inlet passage in communication with the lubricant reservoir and the tank.

19. The engine system of claim 18 wherein the lubricant system includes a lubricant control valve arranged in the lubricant inlet passage and adapted to move between an open position that allows the flow of lubricant from the lubricant reservoir to the tank and a closed position that shuts off the flow of lubricant from the lubricant reservoir to the tank.

20. The engine system of claim 15 wherein the lubricant is oil.

* * * * *